May 8, 1945.    E. A. FORD    2,375,296
RECORD CONTROLLED MACHINE
Filed Nov. 10, 1942    5 Sheets-Sheet 1

INVENTOR
Eugene A. Ford
BY
W. Milson
ATTORNEY

May 8, 1945. E. A. FORD 2,375,296
RECORD CONTROLLED MACHINE
Filed Nov. 10, 1942 5 Sheets-Sheet 2
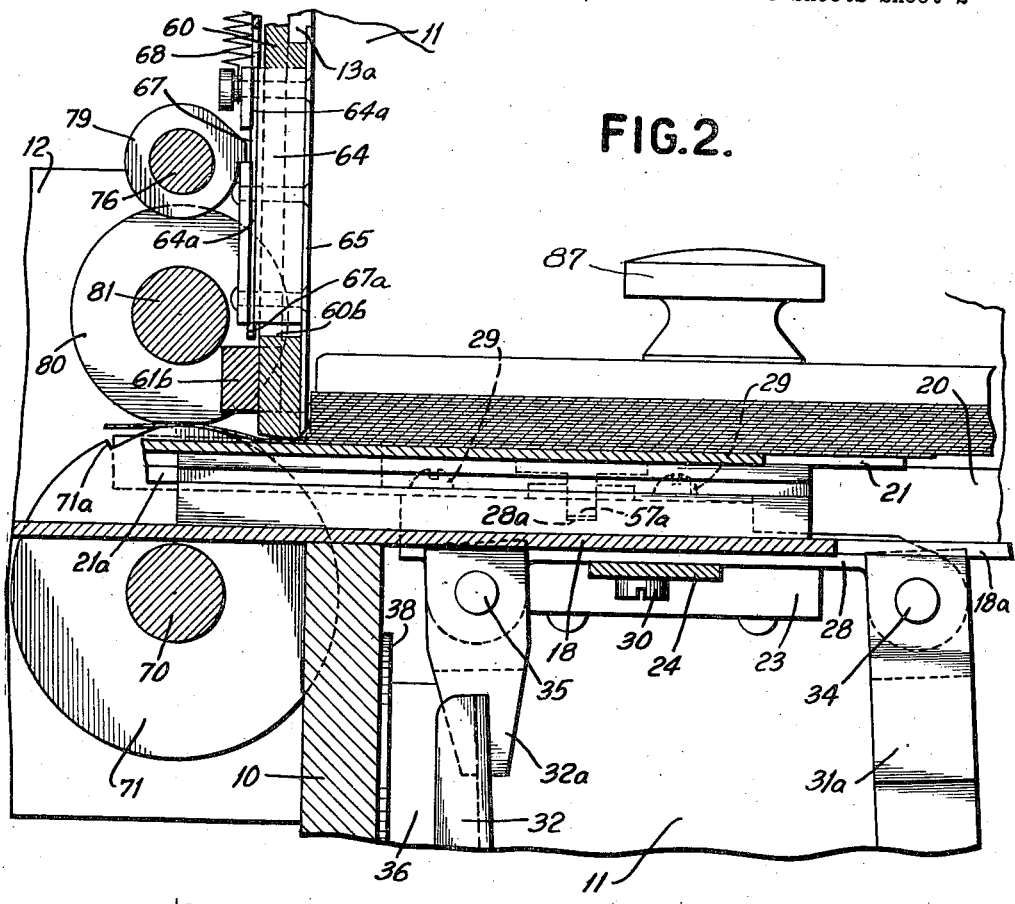
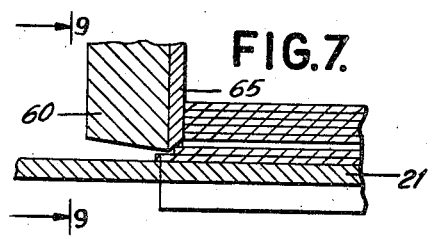
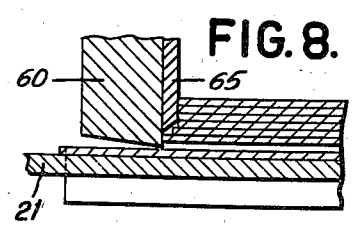
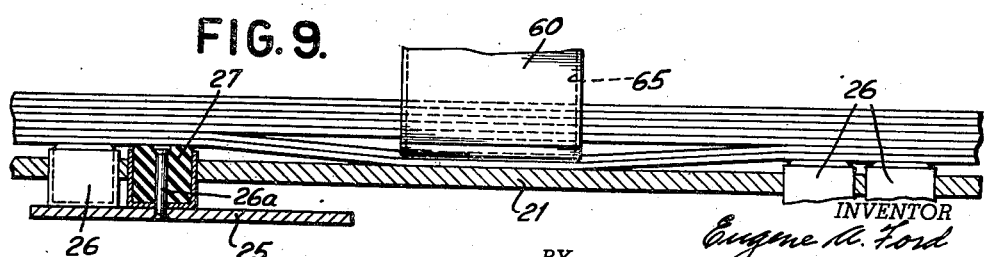
INVENTOR
Eugene A. Ford
BY
W. M. Wilson
ATTORNEY May 8, 1945.  E. A. FORD  2,375,296
RECORD CONTROLLED MACHINE
Filed Nov. 10, 1942  5 Sheets-Sheet 3

INVENTOR
Eugene A. Ford
BY
W. M. Wilson
ATTORNEY

May 8, 1945.    E. A. FORD    2,375,296
RECORD CONTROLLED MACHINE
Filed Nov. 10, 1942    5 Sheets-Sheet 4

INVENTOR
Eugene A. Ford
BY
ATTORNEY

Patented May 8, 1945

2,375,296

UNITED STATES PATENT OFFICE 2,375,296

RECORD CONTROLLED MACHINE

Eugene A. Ford, Scarsdale, N. Y., assignor to International Business Machines Corporation, New York, N. Y., a corporation of New York Application November 10, 1942, Serial No. 465,175

14 Claims. (Cl. 271—44)

This invention relates to record controlled machines.

The primary object of the present invention is to provide an improved means of feeding from a magazine relatively thinner record sheets than are customarily used in record controlled machines.

Heretofore record controlled machines have been customarily controlled by records in the form of perforated cards which are usually thick enough to be accurately fed from the magazine by the usual picker, throat knife, and throat block construction which is easily capable of preventing more than one record at a time from being fed from the magazine. For various reasons it is desirable to use much thinner record sheets but difficulties have been experienced in attempting to feed sheets which are very materially thinner than the ordinary perforated records because of the tendency of the sheets to crumple when fed by the picker knife due to insufficient rigidity of the record. On account of the necessity for providing a vacuum pump, vacuum sheet feeders are not suitable, furthermore they are inclined to be bulky and take up too much room in an otherwise compact machine. Friction feeding devices of the usual types are not suitable or reliable enough for various reasons, primarily because such feeders have a tendency to advance more than one sheet at a time. When used on a printing press the feeding of more than one sheet is of little importance since the sheets are usually unprinted blanks and no harm is done. However, if two sheets are fed to a record controlled machine one may wholly or partly cover the holes or designations in the other and have the effect of a blank record causing incomplete operation. Also errors may occur such as in a sorting machine failure to sort the cards properly. It is imperative that the sheet feeding mechanism used in a record controlled machine be very precise in its operation and feed only one record at a time otherwise troubles like the above may occur.

The main object of the present invention, therefore, is to provide an improved friction feeding device suitable for use in record controlled machines, such as punches, sorters, tabulators, interpreters, and collators, which is accurate and reliable enough to prevent the errors which arise from failure to feed or from the feeding of more than one sheet at a time.

Another object is to provide an improved throat construction for sheet feeding devices of this nature.

Another object is to provide an auxiliary throat knife which is mechanically actuated at the proper time to prevent feeding more than one sheet to the record controlled machine.

An object is to provide a friction feeding mechanism which is capable of reliably feeding thin sheets at high speed to such machines as sorters which necessarily must be capable of operating at high speeds.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a vertical section.

Fig. 7 is a large scale vertical section of the card throat showing the auxiliary throat plate in lowered position with the first record sheet slightly advanced from the magazine.

Fig. 8 is a view similar to Fig. 7 showing the auxiliary throat plate in elevated position with the first card advanced an appreciable amount from the magazine and the second sheet stopped by the throat knife.

Fig. 9 is a vertical section on the line 9—9 in Fig. 7.

Fig. 1 shows the feeding mechanism as applied to a well known form of record controlled machine such as the "International" horizontal sorting machine. It will be understood, however, that the feed mechanism may be applied to other machines and that the sorting machine is selected purely for purposes of illustration.

Figure 1:
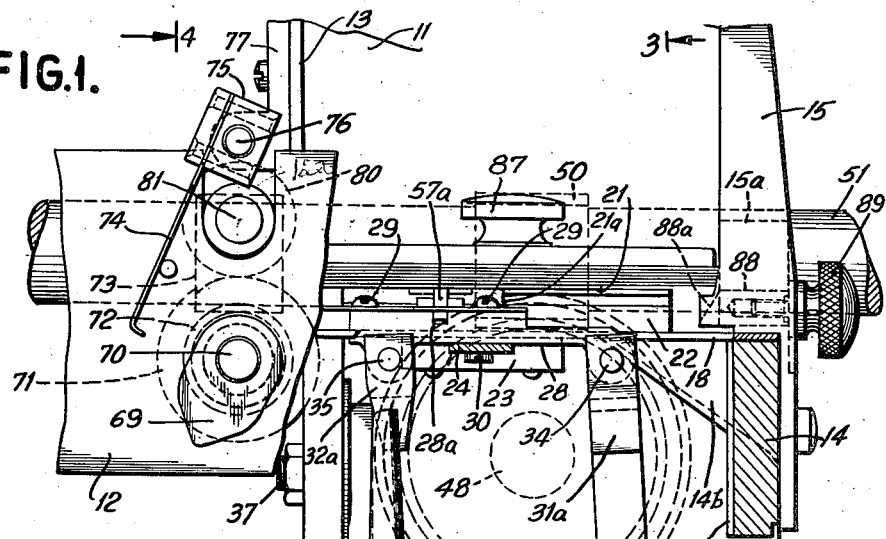
Fig. 1 is a front elevation, partly in section, showing the sheet feeding mechanism.
Figure 3:
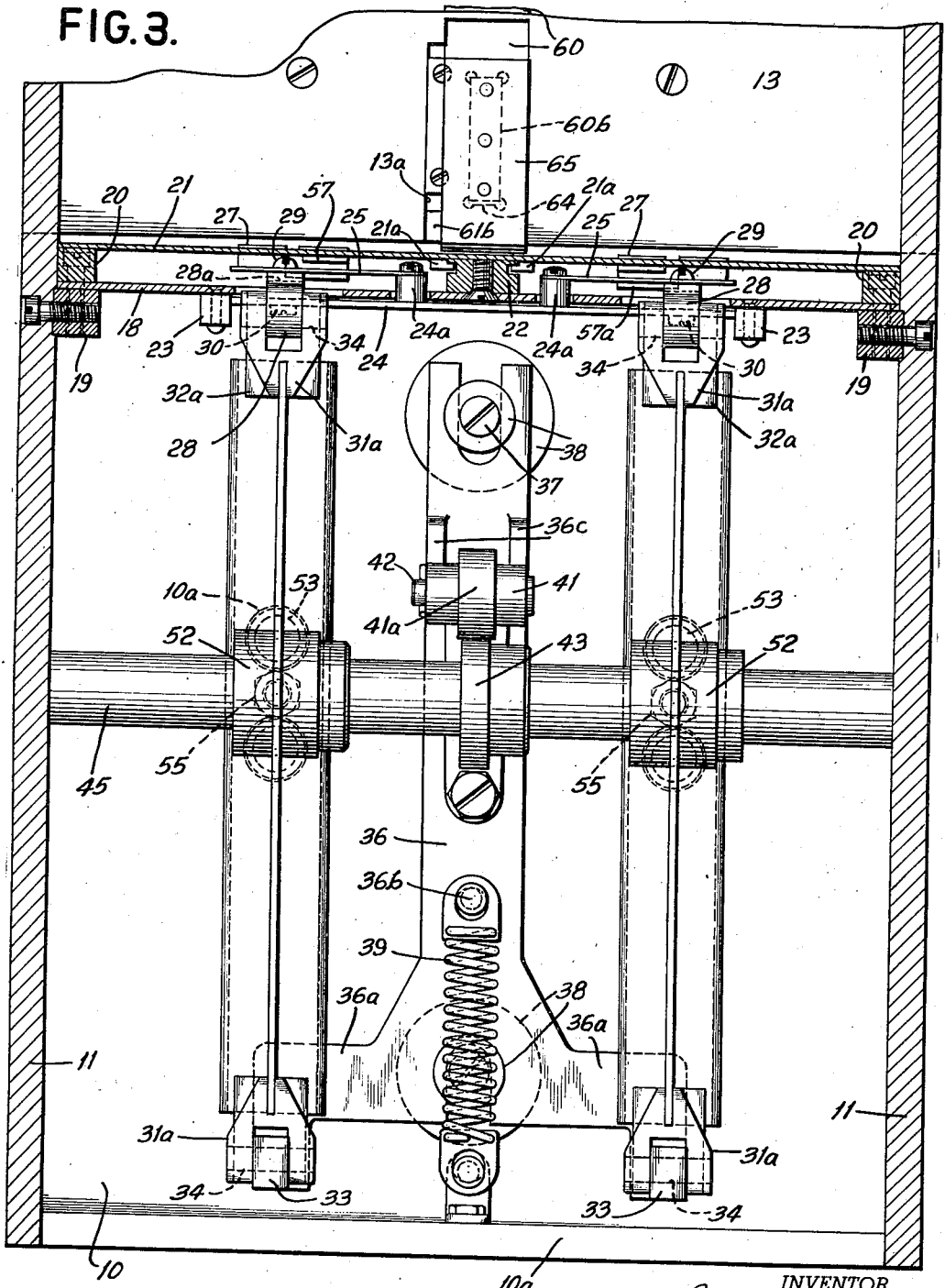
Fig. 3 is a vertical section on the line 3—3 in Fig. 1.

The bulk of the mechanism is supported on a vertical transverse plate 10 which is best shown in Figs. 1 and 3 as joined to the parallel front and rear frame plates 11 of the sorting machine. The plates 11 also support parallel bars 12 (Figs. 1, 2, and 5) on which are the journals for the feed rollers which transport the record cards to the respective pockets (not shown) of the sorter.

Figure 4:
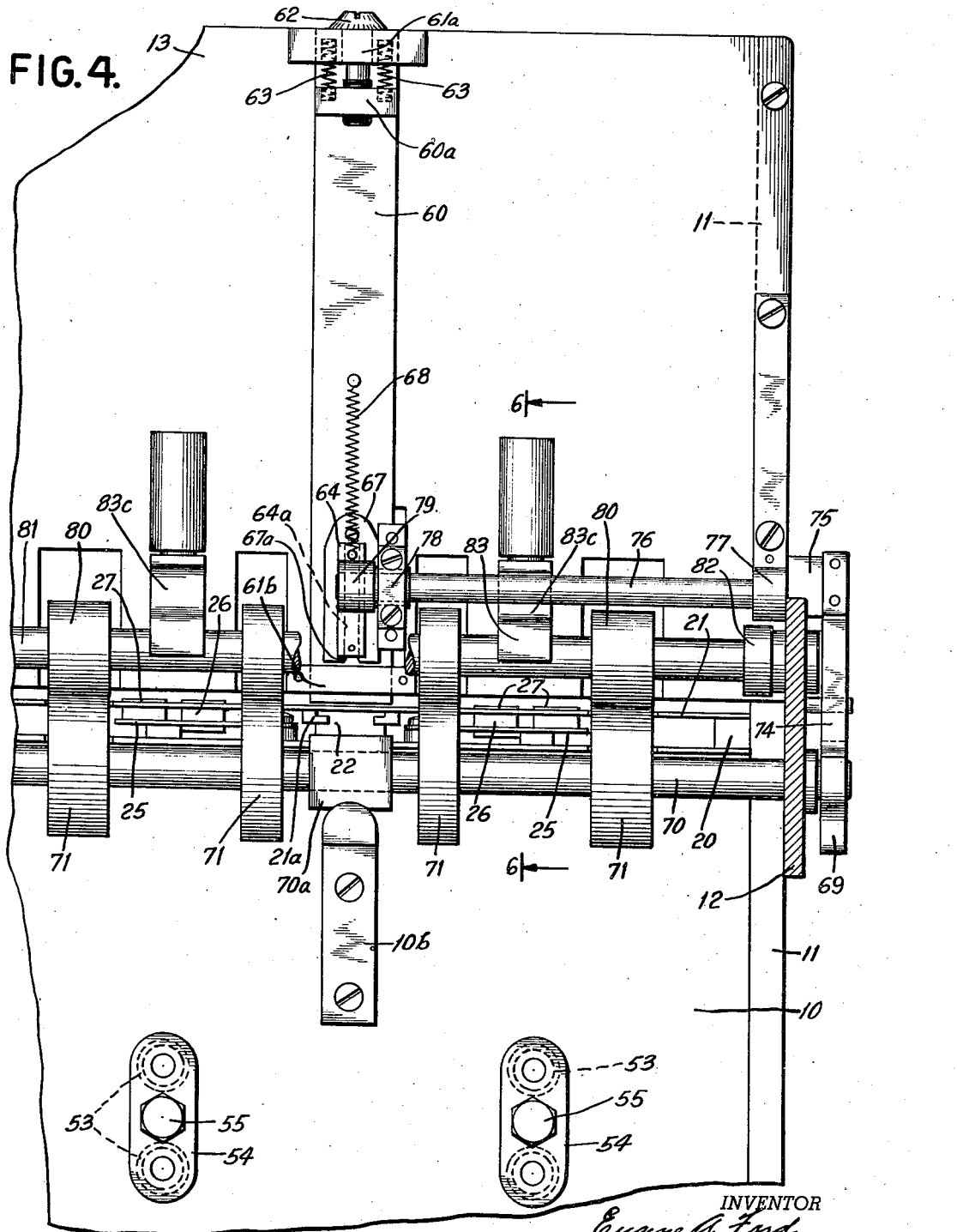
Fig. 4 is a vertical section on the line 4—4 in Fig. 1.

As most clearly shown in Figs. 3 and 4, the plates 11 extend well above the bars 12 and, with a cross plate 13 secured to plates 11, form the ends and one side of the magazine. Secured to a bar 14 mounted on plates 11 is a pair of posts 15, which with the plate 14 guide the right hand or trailing edges of the record sheets downwardly, the sheets being guided at their ends by plates 11 and at their leading edges by plate 13. The plates 10 and 11 are mounted upon the top surface of the usual base casting designated 17 in Fig. 1.

Figure 5:
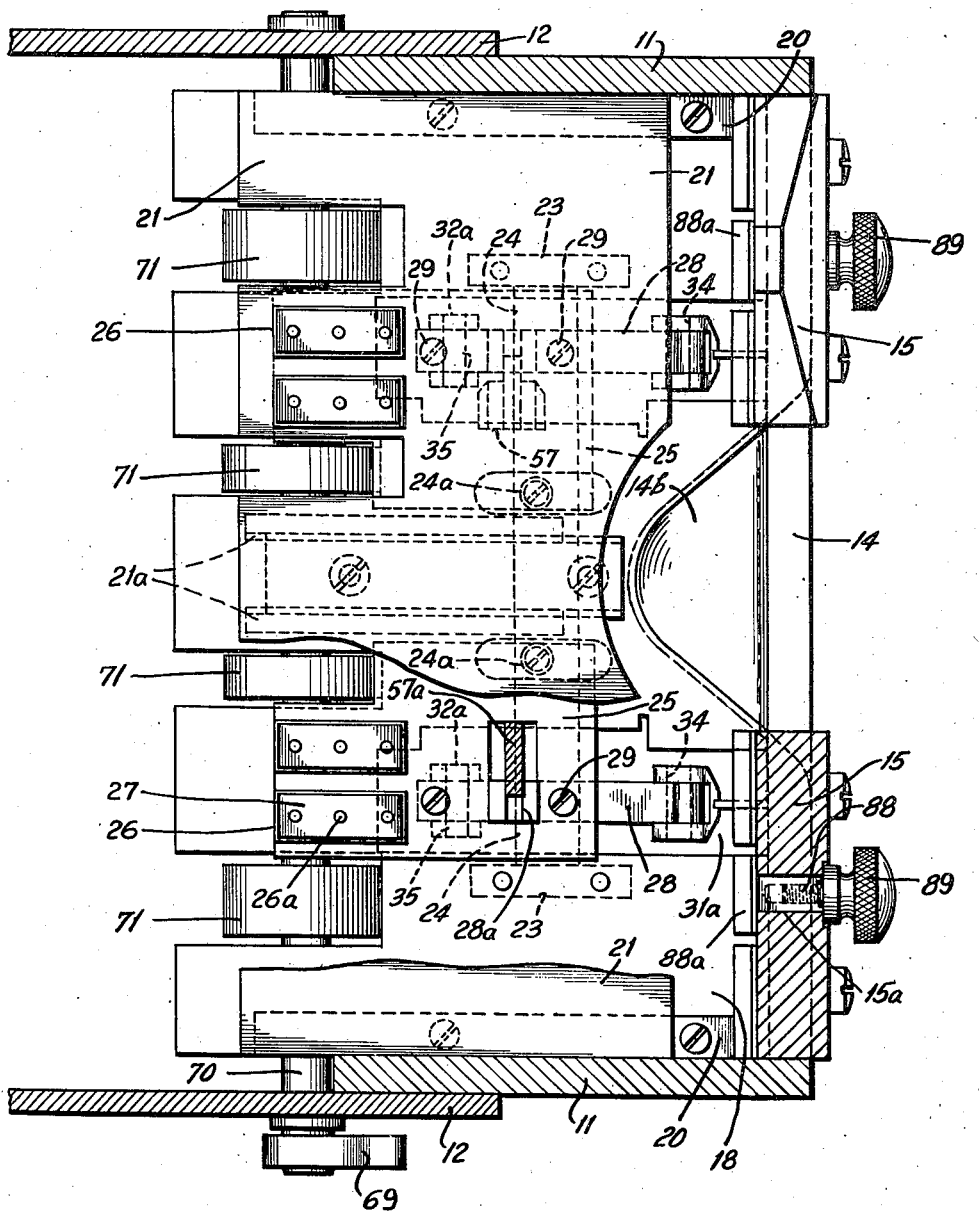
Fig. 5 is a plan view.

The plates 11 are joined by a magazine bottom plate 18 which is secured to short bars 19 fastened to the inside faces of the plates 11 as most clearly shown in Figs. 3 and 5. The bottom plate 18 is shaped with a deep notch 18a, as best shown in Fig. 5, to enable the operator's fingers to be inserted underneath the cards for the purpose of removing cards from the magazine. Bar 14, between posts 15, has a somewhat similar but shallower notch in its top edge for the same purpose. Secured to the right hand face of bar 14 (see Fig. 1 also) is a guard plate 14a formed with a finger pocket 14b shaped to close the space between the edges of the notch 18a and the notch in bar 14.

Secured to the plates 18 and bars 19 are guide bars 20 (Figs. 2, 3, and 5) which slidably support a plate 21 the ends of which are guided by the plates 11 for oscillatory movement to right and left (Figs. 1, 2, and 5). Secured to the top surface of the plate 18 is a guide bar 22 (see Figs. 3 and 4 also) having its opposite vertical faces grooved to receive guide strips 21a forming part of the plate 20. Thus the relatively thin plate 21 is rigidly supported at the middle yet permitted to slide freely on the bars 20, 22. Conveniently the plate 21 may be termed the feed plate since it supports the record sheets while they are being advanced from the magazine.

Secured to the underside of the plate 18 is a pair of guide bars 23 (Figs. 1, 2, 3, and 5) which guide the ends of a cross bar 24 supported in a manner to be made clear hereinafter. The bar 24 is provided with a pair of posts 24a on which are secured plates 25. Each pair of plates 25 has secured to it a box 26 in which is mounted a friction pad or shoe 27, the pads and boxes 26 being preferably secured to plates 25 by means of rivets 26a. The boxes 26 and their rubber pads 27 comprise friction feeding shoes which extend upwardly through rectangular openings in the plate 21 so that the feeding shoes move horizontally with said plate, but, as will appear hereinafter, are also capable of a vertical movement. There are four of the feeding shoes 27, two for each plate 25, and they are disposed on opposite sides of the guide bar 22 which is located centrally with respect to the plates 11 and disposed parallel with the line of feed of cards or sheets advanced from the magazine.

Means is provided for raising the shoes 27 into engagement with the end surface of the bottom sheet and also for oscillating the plate 21 for the purpose of moving the first sheet from the magazine. The plates 25 are attached to horizontal bars 28 (Figs. 1, 2, 3, and 5) by means of screws 29 which bars extend parallel with the plate 11, and the bar 24 is also attached near its ends to the undersides of the bars 28 by means of screws 30.

The bars 28 form the upper members of parallel motion linkages which are mounted in the space between the side plates 11, plate 18, and base 17. There are two of these parallel motion linkages each of which has a pair of parallel vertical bars 31, 32 (Figs. 1, 2, and 3) pivoted at their lower ends on the posts 33. The bars 31 are provided at their ends with yokes 31a pivotally connected by four pins 34 to the bars 28 and posts 33 whereby the left hand ends of the bars 28 are pivotally supported by the bars 31. The bars 32 are formed of flanged strips which are channel shaped in horizontal or transverse section and similarly connected to the posts 33 and bars 28 by means of yokes 32a and pins 35.

The posts 33 are mounted on the divergent arms 36a of a slide 36 (Figs. 1 and 3) which is shaped like an inverted T (Fig. 3) and is guided vertically by means of studs 37 and washers 38 disposed on opposite faces of the plate 36. A spring 39 anchored to a pin 36b carried by slide 36 and to a pin 40a carried by a bracket 40 secured to a flange 10a of plate 10, urges the slide 36 downwardly. The slide 36 is provided with lugs 36c between which is pivoted a cam follower lever 41 by means of a pin 42. The cam follower lever 41 has a roller 41a contacting a cam 43 secured to a shaft 45 journaled in the plates 11. The shaft 45 has secured to it a gear 46 (Fig. 1) meshing with a similar gear 47 secured to the stub shaft 48. Secured to the stub shaft is a spiral gear 49 which meshes with a spiral pinion 50 secured to the main drive shaft 51 of the sorting machine. This shaft extends to the left and is provided with a suitable pulley connected by a belt to a driving motor which turns the shaft 51 continually while the machine is in operation. The shaft 45 is also provided with two cams 52 engaging the flat surface of the channel shaped members 32 which are held in engagement with cams 52 by means of coil springs 53, there being a pair of such springs for each member 32. The coil springs 53 extend through openings in the plate 10 and are seated by means of pilot pins 54a on a plate 54. The plate 54 is secured to the plate 10 by means of a screw stud 55 and is spaced from plate 10 by means of a suitable bushing 56.

It is evident that, as the shaft 45 rotates in the direction of the arrow (Fig. 1), the cam follower 41 eventually will be raised carrying with it the slide 36. This will lift the posts 33 and the arms 31, 32 of the parallel motion linkages. It is also evident that the rotation of the shaft 45 will cause members 31, 32 to be oscillated by cams 52 causing the bars 28 to be reciprocated in substantially a straight line owing to the length of the members 31, 32. The cams 43 and 52 are so timed that, on the oscillation of bars 28 to the right from the position of Fig. 1, spring 39 and cam 43 hold the feeding shoes 27 in lowered, that is, retracted position. During the leftward stroke of bars 28 back to the position of Fig. 1, cam 43 maintains the feeding shoes 27 in elevated or projected position in engagement with the face of the lowest sheet in the magazine.

In order to relieve the feeding shoes of the load of driving the plate 21, there is secured to the underside of the plate 21 a pair of key blocks 57 which are T-shaped (Figs. 1, 2, 3, and 5) in vertical cross section with the vertical bars 57a (Fig. 2) of the T extending downwardly into the slots 28a formed transversely of the bars 28. This allows the feeding shoes 27 to reciprocate freely and vertically in the openings in plate 21 and at the same time provides a positive driving connection between plate 21 and bars 28. Once each feeding cycle the members 31, 32 are rocked clockwise from the position of Fig. 1 by the spring 53 under control of cams 52 until the members 31, 32 have gone as far to the right as permitted by cams 52. Thereafter the cam 43 becomes operative to raise the slide 36 thereby elevating the bars 28, 24, the plates 25, and the feeding shoes 27 to slightly lift the record sheets in the magazine. The cams 52 then rock the members 31, 32 back to the position of Fig. 1 while the cam 43 is holding the slide in elevated position.

For the purpose of adjusting the level to which the blocks 27 are raised the cam follower 41 may be adjustably rocked on the pin 42. One arm 41b of the cam follower lever extends downwardly approximately parallel with the slide 36 (Fig. 1) and has a threaded hole receiving a bushing 58 provided with a smooth bore through which passes a clamping screw 59 received in a threaded hole in the slide 36. By loosening the screw 59 the bushing 58 may be turned to rock the cam follower lever 41 on the pivot 42 to raise or lower the slide 36 the desired extent whereupon the screw 59 may be tightened to secure the bushing 58 against rotation thereby holding cam follower lever 41 against movement relative to the slide 36.

For the purpose of preventing more than one sheet at a time from being fed from the magazine there is provided a throat mechanism. This mechanism is mounted upon a throat block taking the form of a bar 60 carried by the left hand face of the plate 13. At its upper end the bar is guided by a strap 61a (Fig. 4) which also is part of the mechanism for vertically adjusting the bar 60 while its lower end is guided by strap 61b. This mechanism consists of a micrometer screw 62 having a slotted head shaped like a truncated cone, the conical surface of which is provided with graduations. The shank of the screw 62 is threaded into an offset portion 60a in the upper end of bar 60 and interposed between the portion 60a and the strap 61a are coil springs 63 which are seated in blind holes in said strap and said aforesaid portion. The springs 63 tend to thrust the bar 60 downwardly but the head of the screw 62 acts as a stop to prevent movement of said bar. By turning the screw 62 the bar may be raised or lowered slightly. The purpose of this adjustment is to accommodate for different thicknesses of sheets and to compensate for wear.

At its lower end the bar 60 is beveled slightly as most clearly shown in Fig. 7 to form the throat knife proper. Bar 60 is adjusted vertically relative to slide 21 so that the right hand lower edge (Figs. 2 and 7) is at a level above the top surface of the plate 21 slightly greater than the thickness of one record so as to enable one record sheet to be carried past the throat knife but not two, as shown in Fig. 7.

The lower end of the bar 60 is provided with a rectangular opening 60b (Figs. 2 and 3) through which passes a rectangular block 64 secured to the left hand face (Fig. 2) of an auxiliary throat plate 65. This plate 65, as best shown in Figs. 3 and 9, has substantially the same width as the bar 60. The opening 60b is slightly longer than block 64 whereby said block and the plate 65 are capable of limited vertical sliding movement relative to the bar 60. At its lower end the bar 64 is thick enough so as to extend into a slot 13a in the plate 13 and the plate 65 is located wholly within said slot 13a with its right hand surface (Fig. 2) flush with the right hand surface of the plate 13. The block 64 is somewhat thicker than the portion 60b of bar 60 so as to project well beyond the left hand surface of bar 60. Outside of the bar 60 the block 64 is vertically grooved at 64a to receive a spring retaining plate 67 having a central slot just wide enough to permit the spring plate to be pushed downwardly in the grooves 64b as shown in Fig. 4 to hold the block 64 and plate 65 in place in the opening 60b. A spring anchored to a pin carried by the bar 60 and to the pin carried by the block 64 tends to draw the block upwardly. Spring plate 67 is preformed with a slight bowing or convexity to the right (Fig. 2) so that when pushed into place in the grooves 64a it tends to draw the plate 65 and block 64 to the left (Fig. 2) and keep the plate 65 flush with the inside surface of plate 13. Short spurs are formed at 67a in the lower ends of the prongs in the spring plate 67 which prongs snap underneath the lower end of block 64 to prevent the plate 67 from working loose.

The auxiliary throat plate 65 is operated by means of a cam 69 (Figs. 1 and 4) which is secured to a lower feed roller shaft 70 carrying the feed rollers 71. This shaft 70 is rotated in a counterclockwise direction (Fig. 1) by means of a miter pinion 72 secured to said shaft and a miter pinion 73 secured to the main shaft 51. The shaft 70 is mounted on the bars 12 by means of fixed bearings and is steadied at its middle by a bearing bushing 70a (Figs. 1 and 4) rockably slidably mounted on a bracket 10b (see Fig. 6 also) secured to plate 10.

Cooperating with the cam 69 is a cam follower lever 74 (Figs. 1 and 4) secured to a block 75 fixed to a cam shaft 76. This cam shaft 76 is journaled at its outer or right hand end (Fig. 4) in a bearing 77 secured to the plate 13 by means of the same screws as fasten said plate to the right hand or front frame plate 11. At its inner or left hand end (Fig. 4) the shaft 76 is journaled in a pillow block 78 secured to the bar 60 whereby the inner end of the shaft is adjustable vertically along with the bar 60. At its inner end there is provided a member 79 most clearly shown in Fig. 2 as shaped like a cam with a relatively short straight drop formed by a shoulder, which shoulder projects into a transverse slot 64a (Fig. 2) in the block 64 and engages the bottom wall of the slot. It is evident that, when the shaft 76 is rotated clockwise in Fig. 2, the block and the plate 65 will be thrust downwardly against the tension of the spring 68. The cam 69 is timed so that, when the bottom sheet in the hopper has been slightly advanced through the throat between the plate 21 and the throat knife 60, the cam follower arm 74 will be released and allow the block 64 and plate 65 to be drawn upwardly by spring 68 to the position of Fig. 2 thereby elevating the auxiliary throat plate 65 to a position most clearly shown in Fig. 8.

Cooperating with the rollers 71 are the rollers 80 (Figs. 1, 2, 4, and 6) on a shaft 81 journaled in bearings 82 which are vertically slidably mounted in open slots 12a in the bars 12. The rollers 80 are pressed downwardly into engagement with the rollers 71 by means of pressure shoes 83 in the form of castings having a flat side bearing against the face of plate 13 and a cylindrical notch receiving shaft 81. At the upper ends the shoes 83 are turned with a reduced cylindrical portions 83a (Fig. 6) which slide in the vertical bores of housings 84 secured to the plate 13. The pressure shoes are further reduced in diameter to form shanks 83b loosely sliding in bushings 85 screwed into the upper ends of the bores in the housings 84. Interposed between the bushings 85 and the portions 83a are springs 86 which press the shoes 83 downwardly and thereby urge the rollers 80 into engagement with the rollers 71. The housings 84 are shaped with a clearance space 83c to accommodate shaft 76 as best shown in Figs. 4 and 6.

Figure 6:
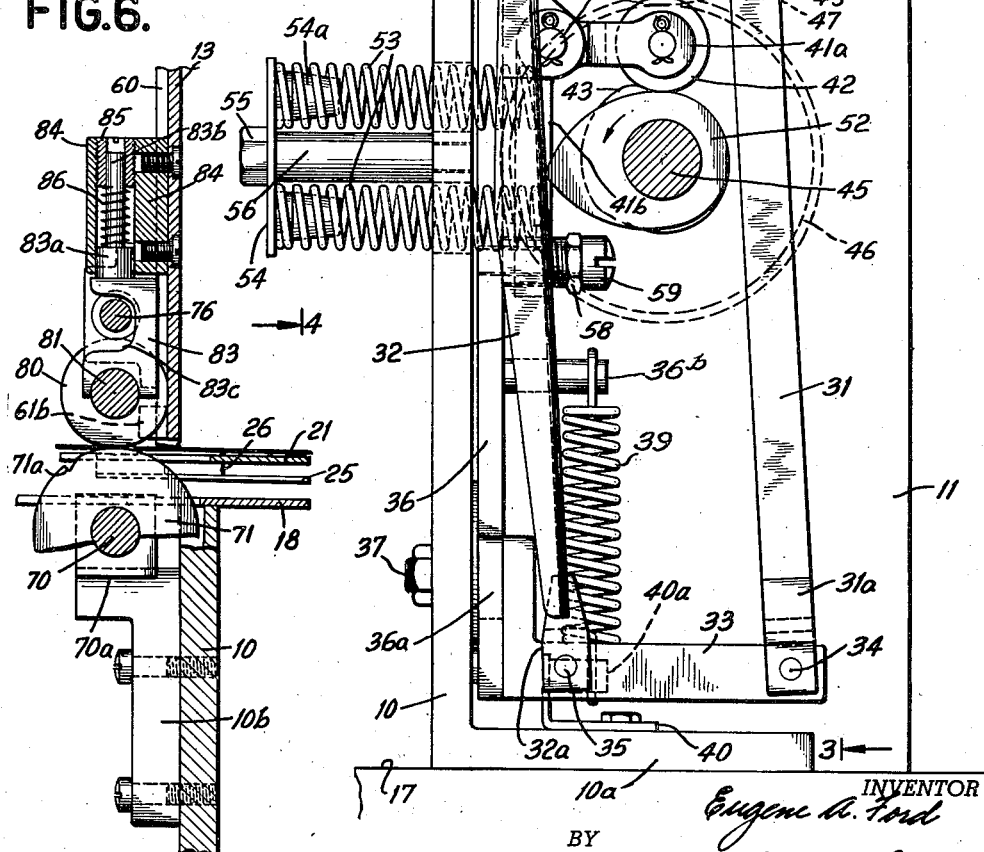
Fig. 6 is a vertical section on the line 6—6 in Fig. 4.

The rollers 71 as most clearly shown in Figs. 2 and 6, are provided with a sheet registering notch 71a. The linear speed of the top surface of the plate 21 in its movement to the left is slightly greater than the peripheral speed of feed rollers 71 and the notches 71a are so positioned that when the bottom sheet is about to enter the bite in the feed rollers 71, 80 the leading edge of the sheet, that is the left hand edge (Fig. 2), will strike the portion of the notch 71a and the sheet will be slightly buckled whereby when the rollers 71, 80 finally firmly grip the sheet the sheet will be accurately registered to insure that the index point positions and any perforations which may be located therein will register with the record sensing mechanism at the proper times. On account of the fact that dependence is placed upon friction to feed the sheets from the magazine it is possible that some slippage may occur between the blocks 27 and the sheets whereby the latter may lag and change the timing of the usual sensing brushes. In other words the 9 perforation conceivably could be sensed at the 8 point in the cycle instead of at the 9 point. By feeding the bottom sheet a little faster than is necessary and stopping the leading edge of the sheet momentarily, the feed rollers 71 and 80 will always grip the sheet at precisely the same point with reference to the leading edge of the sheet whereby the leading edge of the sheet will always strike the sensing brushes at exactly the same time in every cycle.

This feature is of importance because in record controlled accounting and statistical machines utilizing the timed brush method of sensing the perforations, the timing relation between the brushes and perforations and the mechanisms controlled thereby is apt to be quite critical. Where relatively thick stiff cards are fed by means of a picker, as is usually the case, the timing may be maintained very accurately by adjusting the position of the picker knife which usually engages the trailing edge of each record. In the present case, however, the timing must be adjusted in relation to the leading edge of the card and therefore some means must be provided to accurately time the leading edge of the card to insure accurate synchronization between the travel of the card and the printing, punching, sorting, and other functions which are customarily controlled by the sensing mechanism.

Figs. 7, 8 and 9 illustrate the theory of operation of the auxiliary throat plate or knife 65. The lower edge of this plate is beveled oppositely to the throat block or bar 60. Just before the plate 21 starts to feed the bottom sheet past the right hand lower edge (Fig. 7) of the throat knife 60, the plate 65 is thrust downwardly by the cam 69 to the position of Fig. 7 whereby the beveled edge of the plate 65 guides the first sheet through the throat formed between the plate 21 and the right hand lower edge of the throat block 60. When the first sheet reaches the position of Fig. 7, the cam 69 releases the auxiliary throat plate 65, permitting the spring 68 to draw said throat plate upwardly to the position of Fig. 8. Naturally there will be some friction between the bottom sheet and the next one above it which will tend to feed the second sheet out of the magazine. On account of the fact that the throat knife 60 is adjusted to permit only one sheet to pass through the throat and the fact that the plate 65 has been drawn upwardly, the second sheet, instead of being guided toward the throat and having its leading edge jammed between the bevel on the plate 65 and the top surface of the first card, will strike the vertical right hand surface of throat knife 60 as in Fig. 8 and will have no tendency to be thrust downwardly. Thus the second sheet will be stopped and the first sheet will be allowed to pass through the throat and out of the magazine without difficulty. On account of the thinness of the sheets in the magazine, the bottom sheets have a tendency to sag, as in Fig. 9, which shows the condition greatly exaggerated. This sagging tendency will be present in all the sheets in the magazine and does not interfere with the proper feeding of cards, notwithstanding the fact that the top surface of the blocks 27 is at a somewhat higher level than the top surface of the plate 21 when the blocks are fully elevated.

In order to press the cards firmly downwardly in the magazine and to hold them flat, particularly when the magazine is near exhaustion, there is provided the usual follower plate 87. It has been found that thin record sheets have some tendency to curl or bow transversely of the cards. When the bowing is concaved upwardly with reference to Fig. 2, the left hand or leading edges of the sheets may be raised sufficiently to prevent the bottom sheet from passing through the throat. In other words, the bottom sheet may strike the vertical straight face of the plate 65 making it impossible to feed the sheets and perhaps causing them to crumple in the magazine.

In order to avoid this difficulty there is provided leveling means which consist of two T-shaped blocks 88 (Fig. 1) each having its shank, consisting of the vertical bar of the T, fitting in a vertical slot 15a in one of the posts 15. The cross bar of the T-shaped block is beveled as shown at 88a and occupies a position just below the edges of the cards in the magazine. Threaded into the shanks of the blocks 88 are thumb screws 89 which may be loosened to adjust the blocks 88 upwardly or downwardly in the slots 15a.

When the record sheets are warped so badly that they are concave upwardly, the thumb screws 89 are loosened and the blocks 88 raised so as to tilt the record sheets in the magazine in a counterclockwise direction (Fig. 1) until the face adjacent the leading edges of the bottom sheet lies flat on the plate 21 adjacent the throat block 60. It is for this reason that the blocks 27 are located on the plate 21 closer to the throat block 60 than the posts 15, otherwise the blocks would be unable to grip the bottom sheet when the sheets are concave upwardly. When the cards are concave downwardly then the leading edges tend to press down upon the top surface of plate 21 adjacent the throat block and the blocks 27 rise high enough to engage the bottom sheet and little difficulty is experienced in feeding the sheets.

While there have been shown and described and pointed out the fundamental novel features of the invention as applied to a single embodiment it will be understood that various omissions and substitutions and changes in the form and details of the device illustrated and in its operation may be made by those skilled in the art, without departing from the spirit of the invention. It is the intention, therefore, to be limited

What is claimed is:

1. In a device for feeding sheets from a stack, a reciprocating friction feeder, means for pressing the stack of sheets toward said feeder so that one end sheet of the stack is held against the feeder; a throat knife at an angle to said feeder and separated therefrom to form a throat between its edge and said feeder, through which a single sheet can pass; an auxiliary throat plate mounted to reciprocate between said throat knife and the stack of sheets in a direction at an angle to reciprocations of said feeder; and means to reciprocate said auxiliary throat plate in timed relation with the movement of said feeder, said auxiliary throat plate having a beveled edge adjacent said throat and being timed to move its beveled edge at least into coincidence with the throat edge of said throat knife just as the feed movement of said feeder begins, and then to move back from the throat so that the side of said throat knife confronting said stack is presented to the sheets other than the one in contact with said feeder.

2. In a device for feeding sheets from a stack, a feed plate on which the stack rests and having a reciprocating feed movement, a throat knife under the edge of which said support moves with a clearance sufficient to pass the first sheet in said stack, an auxiliary throat plate mounted to reciprocate on the face of said throat knife nearest the stack and having a beveled sheet guiding bottom edge, and means for moving said auxiliary throat plate in a timed relation with the movement of said support so that the beveled edge thereof moves down at least into coincidence with the edge of said throat knife as the feed movement of said feed plate begins, and then moves quickly up to expose said face of said throat knife to the sheets following the first sheet.

3. In a device for feeding sheets from a stack, a frame, a feed plate mounted on said frame so as to be reciprocable parallel to the face of said plate, a friction member carrier mounted on said frame so as to be movable transversely of the face of said feed plate and also parallel thereto, said feed plate having apertures and said friction member carrier having friction members which can be protruded through said apertures by said transverse movement of said friction member carrier, means for effecting said movements of said friction member carrier, and means interconnecting said friction member carrier and said feed plate so that the latter participates in the movements of said friction member carrier parallel to the face of said feed plate.

4. In a device for feeding sheets from a stack, a main frame, a flat feed plate mounted on said frame so as to be reciprocable parallel to the face of said plate, a sliding frame mounted on said main frame for movement perpendicular to the face of said feed plate, a friction member carrier, a parallel bar linkage for mounting said carrier on said sliding frame, said feed plate having apertures and said friction member carrier having friction members thereon adapted to be protruded through said apertures by movement of said sliding frame, said friction member carrier being movable parallel to the face of said feed plate by the swing of said parallel bar linkage, means for moving said sliding frame and said parallel bar linkage so as to cause said friction member carrier to move in a substantially quadrilateral path, and means interconnecting said friction member carrier and said feed plate so that the latter participates in the movements of said friction member carrier parallel to the face of said feed plate.

5. In combination with a sheet magazine, means for feeding sheets from said magazine including a feed plate against which the first sheet to be fed presses; a throat knife coacting with said feed plate to prevent more than one sheet at a time to be ejected from said magazine, said knife having a face confronting the edges of the sheets in said magazine; an auxiliary throat plate movable on said face and having a sheet guiding portion to guide the first sheet past said knife, said plate being movable to a position to render said sheet guiding portion inoperative after said sheet has passed said knife to permit succeeding sheets to strike said face while the first sheet is being ejected from the magazine; and means to actuate said auxiliary plate to and from said position in timed relation to said feed plate.

6. In combination with a sheet magazine, means to eject a sheet from said magazine, a throat knife positioned to limit ejection to one sheet at a time from said magazine and having a face parallel with the edges of said sheets in said magazine and confronting said edges; and an auxiliary throat plate mounted on said face and having a sheet guiding portion to guide the first sheet past said knife and retractable after the first sheet is started past said knife to remove said sheet guiding portion from the edge of said knife sufficiently to enable succeeding sheets to strike the face of said knife to prevent said succeeding sheets from being guided from said throat.

7. In combination with a sheet magazine, a feed element for ejecting sheets from said magazine, a throat element positioned to prevent more than one sheet from being ejected from said magazine at a time and having a face confronting the leading edges of sheets in said magazine, and an auxiliary throat element having a sheet guiding surface and movable to one position to enable said surface to guide the first sheet past said first throat element, said auxiliary element being retractable to another position to prevent guiding subsequent sheets past said first throat element and to permit said subsequent sheets to strike said face and be stopped thereby.

8. In combination with said magazine, means to eject sheets from said magazine, a throat element for preventing more than one sheet at a time from being ejected from said magazine and having a sheet stopping portion coactive with the leading edges of sheets immediately succeeding the one to be ejected from the magazine; a second throat element engaging the leading edges of the sheets in said magazine and interposed between said first element and the leading edges of said sheets, said second throat element being adapted to guide the first sheet to and past the first element, and means operative after the first sheet has been partly ejected from said magazine to shift said second element to a position to permit the sheets following the one in course of ejection to strike said stop portion.

9. In combination with a sheet magazine, a feed plate supporting a stack of sheets in said magazine and mounted for reciprocatory movement to eject a sheet from said magazine and having feeding pad openings; feeding pads protrudable through said openings to engage said sheets, said pads also being mounted to follow the reciprocations of the feed plate; means to reciprocate said feed plate, and means to protrude said pads and maintain them protruded during the sheet ejecting stroke of said plate and to withdraw said pads and maintain them in withdrawn position during the return reciprocation of said plate.

10. In combination with a sheet magazine, a sheet support mounted for reciprocatory movement to eject the sheet from the magazine; friction means movable to a position of engagement with a sheet on said support during its ejecting movement and retractable from engagement with said sheet, said friction means also being movable with said sheet support during its sheet ejecting movement; means to reciprocate said sheet support, and means to engage said friction means with said sheet and maintain such engagement during the sheet ejecting stroke and operative to withdraw said means from said sheets and maintain said means in withdrawn position during the return reciprocation of said support.

11. In combination with a sheet magazine, a sheet support mounted for to-and-fro movement to eject a sheet from the magazine, friction members movable to engage a sheet on said support during its sheet ejecting movement, a parallel motion linkage supporting said friction members, and means to oscillate the parallel motion linkage to produce a to-and-fro movement of the friction members and also to move said friction members into engagement with the sheet during the sheet ejecting oscillation of the parallel motion linkage.

12. In a machine of the class described in combination with a sheet magazine, a throat member, a member coacting with the throat member to form a throat to limit the ejection of sheets from said magazine to one at a time, means to adjust said throat member to the extent necessary to restrict ejection of sheets to one at a time; an auxiliary throat member mounted on the first throat member for reciprocatory movement toward and away from the edges of the first few sheets in said magazine cooperating with the throat portion of the throat member and adapted to guide said sheets through said throat, said auxiliary throat member being adjustable with the first throat member; and means operative to reciprocate said auxiliary throat member in a timed relation to the ejection of sheets from said magazine, said means being timed to withdraw the auxiliary throat member from sheet guiding position after a sheet has been partly ejected from the magazine past the first throat member.

13. In combination with a sheet magazine, a stationary throat member adjustable transversely of the leading edges of the first sheet in said magazine to limit ejection from said magazine to a single sheet, a member cooperating with the throat member to determine the sheet ejection plane and located at a fixed distance from the throat member as determined by adjusting the latter, an auxiliary throat member movable transversely of said plane away from a position in which the auxiliary member guides the first sheet to be ejected past the first throat member, and means operated in timed relation with the ejection of a sheet from said magazine to withdraw said auxiliary throat member from sheet guiding position after a sheet has been partially ejected from said magazine.

14. In combination with a sheet magazine, a fixed member coacting with the first sheet of a stack of sheets in said magazine to determine the sheet ejection plane for the first sheet; a fixed throat member coacting with said first member at a constant distance from the latter to form a throat to limit ejection from the magazine to a single sheet at a time parallel with said plane, an auxiliary throat member reciprocable from a sheet guiding position in which said auxiliary member guides the first sheet to be ejected past said throat member and movable to a position to enable the sheets immediately succeeding the one ejected to be stopped by the first throat member, and means to adjust both said throat members in unison to vary the width of the throat.

EUGENE A. FORD.